United States Patent
Buchanan

(10) Patent No.: US 7,448,602 B2
(45) Date of Patent: Nov. 11, 2008

(54) DE-ENTRAINMENT OF LIQUID PARTICLES FROM GAS

(75) Inventor: John Scott Buchanan, Lambertville, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 11/543,868

(22) Filed: Oct. 6, 2006

(65) Prior Publication Data

US 2007/0023937 A1    Feb. 1, 2007

Related U.S. Application Data

(63) Continuation of application No. 10/830,168, filed on Apr. 22, 2004, now Pat. No. 7,137,622.

(51) Int. Cl.
B01F 3/04 (2006.01)
(52) U.S. Cl. .................. 261/114.1; 261/114.5; 55/444; 96/190; 96/358
(58) Field of Classification Search ... 261/114.1–114.5; 55/444; 96/190, 204, 207, 215, 358
See application file for complete search history.

(56) References Cited

U.S. PATENT DOCUMENTS

| | | | |
|---|---|---|---|
| 877,460 A | 1/1908 | Brunner | |
| 1,854,340 A | 4/1932 | Langvand | |
| 2,398,345 A * | 4/1946 | Cooper | 261/108 |
| 4,035,171 A * | 7/1977 | Reed et al. | 96/190 |
| 4,198,215 A | 4/1980 | Regehr | |
| 4,361,469 A | 11/1982 | Trutna | |
| 4,381,974 A | 5/1983 | Furzer | |
| 4,496,430 A | 1/1985 | Jenkins | |
| 4,582,569 A | 4/1986 | Jenkins | |
| 4,759,315 A | 7/1988 | Chiou et al. | |
| 4,981,113 A | 1/1991 | Kannan et al. | |
| 4,995,946 A | 2/1991 | Auger | |
| 5,091,060 A | 2/1992 | Walker et al. | |
| 5,660,049 A | 8/1997 | Erickson | |
| 5,683,493 A | 11/1997 | Stober | |
| 5,695,548 A | 12/1997 | Trutna | |
| 5,766,519 A | 6/1998 | Erickson | |

(Continued)

FOREIGN PATENT DOCUMENTS

GB     08 208 B1     4/1909

(Continued)

*Primary Examiner*—Scott Bushey
(74) *Attorney, Agent, or Firm*—Glenn T. Barrett; W. Robinson H. Clark

(57) ABSTRACT

A multi-tray distillation unit having a separator for de-entraining liquid particles. The separator comprises vertically spaced tiers of elongated, substantially horizontal open-topped liquid collector channels arrayed in parallel rows transversely to the flow of the gas. The liquid collector channels are vertically staggered to deflect the gas flow from a lower tier level through the gaps between the collection channels of an upper tier and around the channels so as to cause the entrained liquid particles to separate from the gaseous stream by inertia into the channels of the lower tier. An improved channel configuration has a rigidly-mounted, horizontally-elongated flow deflector extending downwards from an upper tier channel toward a lower tier channel, this provides gas flow deflection and increased efficiency of liquid particle de-entrainment.

9 Claims, 6 Drawing Sheets

U.S. PATENT DOCUMENTS

| | | |
|---|---|---|
| 5,770,020 A | 6/1998 | Koistinen et al. |
| 5,798,086 A | 8/1998 | Erickson |
| 5,837,105 A | 11/1998 | Stober et al. |
| 6,059,934 A | 5/2000 | Stober et al. |
| 7,137,622 B2 * | 11/2006 | Buchanan ................ 261/114.1 |
| 2004/0107682 A1 | 6/2004 | Letzel |

FOREIGN PATENT DOCUMENTS

| | | |
|---|---|---|
| GB | 166 677 B1 | 7/1921 |
| GB | 169 458 B1 | 1/1923 |
| WO | WO 02/074404 B1 | 9/2002 |

* cited by examiner

DE-ENTRAINMENT OF LIQUID PARTICLES FROM GAS

CROSS REFERENCE TO RELATED APPLICATION

This application is a continuation of U.S. patent application Ser. No. 10/830,168, filed Apr. 22, 2004 now U.S. Pat. No. 7,137,622 issued Nov. 21, 2006.

FIELD OF THE INVENTION

The present invention relates to liquid-gas phase separation techniques. In particular, it relates to de-entrainment of liquid particles suspended in an upwardly flowing gas stream, such as encountered in a distillation tower or the like.

BACKGROUND OF THE INVENTION

Typically, distillation unit operations are conducted in countercurrent multi-tray towers in which the liquid flows across the trays and down the column by way of downcomers, while the gas passes upward through the trays, which may contain contact plates, bubble caps, sieves or similar contact devices. Mass transfer occurs in the liquid-gas mixtures near the bottom of each tray. Phase separation, necessary to secure overall countercurrent flow of gas and liquid, takes place by gravity in the spaces between the trays.

During the flow of the vapor and the liquid through the unit, liquid particles or droplets become entrained in the vapor phase of the upwardly flowing gaseous stream. The entrained liquid is difficult to separate from the flowing stream, and various techniques have been employed to provide phase separation. Various mechanisms may be exploited in the separation. Micro-droplets may be coalesced to form larger drops and liquid particles may be separated by centrifugal force, gravity, or impingement on solid surfaces. Demister screens and flow deflectors of varied design have proven effective in phase separation. Many of these devices, however, are expensive to fabricate and operate, and create excessive pressure drops.

U.S. Pat. No. 4,361,469 (Trutna) teaches co-current distillation components employing a multi-level array of rectangular horizontal channels (or U-shaped troughs) adapted for liquid separation, collection and distribution. The liquid collected in the channels is discharged to a downcomer that delivers the liquid to the tray of a lower stage. The de-entrainment devices may be installed above one or more distillation trays, as required by the particular application. In arrangements of this type, it is expected that most of the liquid swept up between one set of channels will continue to be entrained upward by the gas. The main liquid collection mechanism seems to be eddy flows past the upper edges of the channels. While this method exhibits a low pressure drop, the relative amount of recovered liquid particles is lower than desired. This deficiency is believed to be related to the relatively unrestricted flow path of the vapor stream with entrained particles as it passes through the array of channels.

SUMMARY OF THE INVENTION

According to the present invention, an improved separation system for de-entraining liquid particles from an upwardly flowing gaseous stream, passes a gaseous stream through a de-entrainment zone comprising multilevel tiers of elongated, U-shaped, liquid collector channels arrayed in parallel rows transverse to the gaseous stream flow. The channels are arranged so that they are substantially horizontal, that is, horizontal or with only a slight inclination so that they can effectively function to collect the liquid. The tiers are spaced apart vertically with staggered parallel rows of collector channels to deflect the flow of the gaseous stream from a lower tier level through the open gaps between the channels and around the channels in an upper tier level, thereby permitting liquid particles to separate from the gaseous stream by gravity into lower level channels for collection and distribution via liquid downcomers. A rigid, elongated flow deflector extends parallel with each channel of an upper tier in the region between the tiers; this deflector extends in a downward direction from the channels of the upper tiers towards the channels of the next adjacent lower tier to deflect the gaseous stream flow and increase the efficiency of liquid particle collection in the collector channels. The deflector may be attached directly to the channels of the upper tier or, alternatively, to the channels of the lower tier to provide the desired deflection of gas flow and of separated liquid droplet flow.

The method for increasing the de-entrainment efficiency of the liquid particle from the gaseous stream passes the stream through a de-entrainment zone that includes multilevel tiers of elongated, substantially horizontal, U-shaped, liquid collector channels arrayed in vertically-spaced, parallel rows transverse to gaseous stream flow. The tiers are arranged with staggered parallel rows of collector channels to deflect the gaseous stream flow from a lower tier level around the channels in an upper tier level through open gaps between channels, so as to permit liquid particles to separate from the gaseous stream by gravity into lower level channels for collection and distribution. Flow deflectors extend parallel with each channel of the upper tiers in the region between the tiers; the deflectors extend in a downward direction from the upper channels towards the channels of the next adjacent lower tier to deflect the gaseous stream flow and increase the efficiency of liquid particle collection in the collector channels.

BRIEF DESCRIPTION OF THE DRAWINGS

The invention is described below in more detail with reference to preferred forms of the invention, given by way of example only, with reference to the accompanying drawings in which like numerals are used to designate like parts throughout and in which.

DETAILED DESCRIPTION

Figure 1:
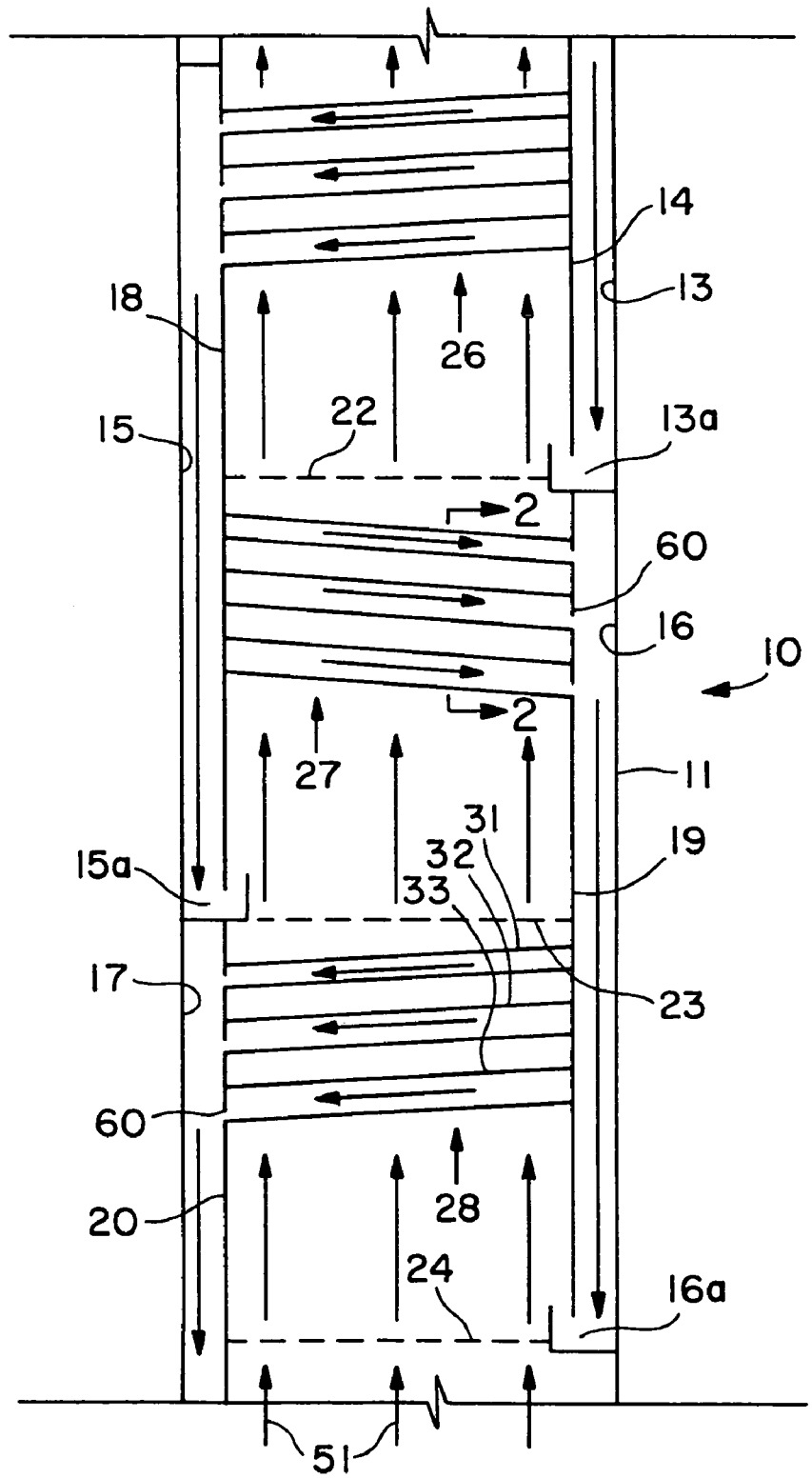
FIG. 1 is a schematic vertical axial cross sectional view showing a distillation column for a multi-level array of liquid collectors arrayed in a de-entrainment zone.

FIG. 1 shows a multi-tray distillation unit in which all the liquid on the tray is entrained upwards, captured in channels after separation from the ascending gas flow and then directed to a preceding contact tray. Distillation column 10 includes an outer shell or wall 11 which may have any suitable horizontal cross section such as circular, square, rectangular, oval, or others. Downcomer passage 13 is provided at one wall of shell 11 by a wall 14. Additional downcomer passages 15, 16 and 17 are defined by shell 11 and walls 18, 19 and 20, respectively.

Adjacent the lower end of downcomer passage 13, a liquid-gas contact tray plate 22 is disposed transversely across the column interior, and similar or identical plates 23, 24 are disposed transversely across the column interior at the lower ends of downcomer passages 15 and 16, respectively. Above each plate 22, 23, 24 there is disposed a gas-liquid separator zone, each separator 26, 27, 28 consisting of plural vertically spaced tiers or levels 31, 32, 33 of horizontally spaced parallel open-topped rectangular channels (referenced only in the lowest tier 28 only, for clarity).

Excessive vapor flows at the channel exit which can interfere with collection and delivery of liquid can also be prevented by providing a separate sealed downcomer for each channel row or stage. This alternative is advantageous where large variations in the liquid-gas ratio are encountered.

The fractionating column shown in FIG. 1 may have any number of superimposed stages, only three stages being shown. Feed vapor enters at the bottom of the column and flows upwardly as indicated by arrows 51. The vapor contacts liquid which is delivered to tray 24 through downcomer 16 and a highly agitated mixture of vapor and liquid flows upward through the column. Liquid is separated from the vapor at separator 28, and the vapor then continues up the tower past tray 23, to which liquid is supplied through downcomer 15 by way of liquid seal pot 15a. The separated vapor flows upwardly past plate 22, to which liquid is supplied through downcomer passage 13 by way of liquid seal 13a, and the resulting gas-liquid mixture flows upwardly, through separator 26. Assuming that separator 26 is at the upper end of the column, the separated vapor continues upwardly leaving the column as indicated by arrows 55 and feed liquid to the column is introduced through downcomer 13. If separator 26 is not at the upper end of the column the separated vapor 55 continues upwardly through the column and the liquid supply through downcomer passage 13 is supplied from a separator higher up in the column. The liquid separated by separator 26 flows downwardly through downcomer passage 15 and liquid seal 15a to plate 23. The liquid separated by separator 27 flows downwardly through downcomer passage 16 and seal 16a to plate 24. The liquid separated at separator 28 flows downwardly through downcomer passage 17 either out of the column or to a plate further down in the column.

As indicated in FIG. 1, the channels of each separator 26, 27, 28 are substantially horizontal so that they can function effectively to collect the separated liquid particles and secure a relatively uniform liquid depth over the lengths of the channels but they are given a slight downward slope toward the downcomer in order to facilitate liquid flow from the collector channel into the downcomer. The channels are preferably sloped downwardly toward the downcomer with a slope of the order of five to ten percent, to facilitate liquid discharge from the channels to the downcomers, while maintaining the desired relatively uniform liquid depth over the lengths of the channels. Thus, the channels are typically at an inclination of no more than 10 percent from the horizontal plane, preferably five to ten percent from the horizontal. For convenience of description, this orientation is referred to here as "horizontal" and the tiers are referred to as "horizontal" tiers notwithstanding the preferred slight departure from true horizontal disposition.

When using the normal open type downcomer, 13, 15, 16 and 17 of FIG. 1, the channels have the outlets from the discharge ends of the channels reduced by skirts 60 to approximately the height of liquid in the channels in order to prevent excessive vapor flow from the column, through the outlets and into the downcomers. If excessive gas flow from the column into the downcomers takes place through the outlets of the lower channels, there is a possibility that reverse gas flow back into the column from the downcomer, through the outlet(s) of the upper channels of the tier, holding up liquid in the upper channel(s). At design conditions, when there is a substantial amount of entrained liquid captured in the lower channel(s), the opening below the skirt will be mainly filled with outflowing liquid, thus blocking gas from exiting from the lower channel into the downcomer. At low liquid entrainment/capture rates, this opening may be completely filled with liquid and hence some gas will get through into the downcomer and then find its way back into an upper channel, holding up the liquid in the upper channel(s). If, however, there is not much liquid to be separated from the gas, hold-up of liquid in the upper channel(s) of the tier may present no significant practical problems.

In general, the proportion of the exit area of the channel outlet which is blocked by the skirt should, in principle, be greatest for the lowest tier, and decrease to zero for the highest tier. The optimal proportion of the outlet blocked on the lowest tier will increase to some degree as the number of tiers increases, since (due to the additional tiers) the pressure drop across the whole channel array (bottom to top) will increase, which tends to increase the pressure difference which tends to drive liquid and gas from the end of the lowest channel, under its skirt, and into the sealed downcomer zone. Thus, as the number of tiers increases, a proportionately smaller open area under the skirt is necessary or, at least, desirable, in order to drain the liquid from that channel. A design in which all the channels in the upper half of the tiers have no skirts, and all the channels in the lower half of the tiers have skirts blocking the upper half (50%) of the channel outlets, has been found to be satisfactory under a range of flow conditions. In a four-tiered construction, for example, the lower two tiers out of four might have skirts blocking the upper halves of the channel outlets while the uppermost two tiers might have channel outlets with no skirts. In the three-tiered separation zone of FIG. 1, the lowest tray might have a skirt blocking the upper half of the channel outlet, the uppermost tray have no skirt and, depending on expected liquid and gas flow rates and entrainment rates, the intermediate tray might have either no skirt or, if the added complication of fabrication be accepted, a skirt blocking less than one half the outlet area. Standard hydraulic calculations and observations of working devices may be used to optimize the size of the skirts for various geometries and operating conditions.

Figure 2:
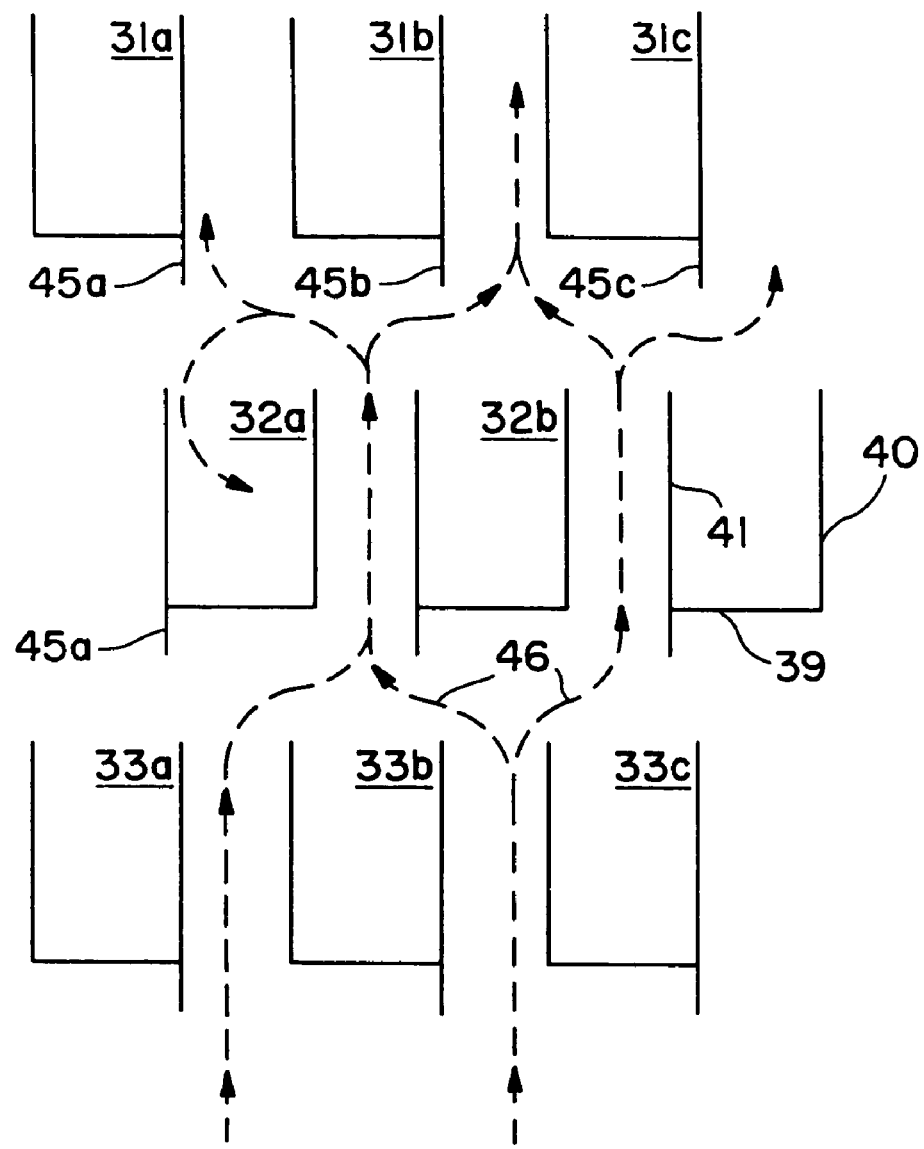
FIG. 2 shows a schematic cross sectional view of a multi-tiered array of collector channels with an affixed deflector according to the present invention.

Referring to FIG. 2, an array of collector channels is shown schematically in partial cross section, showing the deflectors. The individual channels 31A, 31B, 31C, 32A, 33A, etc. are each in the form of an elongated open top channel of rectangular cross section having a bottom 39 and sidewalls 40, 41. The upper tiers at least are provided with deflectors 45A, B, C and, for convenience, the channels may be constructed likewise. The channels are spaced apart vertically in the tiers and horizontally, as indicated in FIG. 2, to provide a de-entrainment zone with an overall horizontal open gap area between channels of at least 20%, preferably 30-60%, most preferably 35-50%, of the total horizontal area of the tier (channels plus gaps). The expected upward gas-liquid flow pattern is indicated by the array of arrows 46. The up-flowing gas-liquid typically is in the form of a two-phase mixture of aerated liquid, foam, spray or gas having entrained liquid droplets. Because of the changes in flow direction, the gas-liquid mixture can be thrust against the channels to separate the liquid which is then collected in the channels underneath, so that a satisfactory separation of the liquid from the up-flowing gas stream occurs.

As shown in FIG. 2, the deflectors 45A, 45B, 45C, are relatively small compared to the height of the channels. The deflectors are less than 50% of the height between tiers, preferably about 10%-45%. The deflectors can form an integral, downward extension of a sidewall or be independently mounted in the desired position, as later explained. The deflector(s) may be positioned anywhere on the bottom of the channel. In a preferred form, all channels in the same row have deflectors similarly positioned. In still another preferred form, all rows either have deflectors asymmetrically positioned or, as shown in FIG. 2, in an alternating mirror-image position. The symmetry of the deflectors may be even further modified as would be apparent to one of ordinary skill in the art.

Vapor stream 51 with entrained liquid flows upwards between the channels and impacts with the channel walls. The de-entrained liquid will collect on the bottom of the channel. Due to deflector configuration and position, the liquid will collect more readily around the deflector, and deposit more freely into the channel below. The deflector partially directs the flow of the gas/liquid current moving past the channel and, in addition, aids in the more complete collection of the liquid by increasing the accuracy of the droplet fall path, allowing a much greater percentage of the de-entrained liquid to fall directly into the channel below. The deflectors may be affixed to the bottom portion of the channel and in parallel to the line of the collector, preferably being oriented within 0-45° of vertical. The deflectors may have a variety of forms, such as serrated or perforated plates or curved surfaces.

As shown by vapor flow through the channels, the deflectors alter the path of the vapor flow. This has the added effect of maximizing the de-entrainment properties of the channel by inertial separation of the entrained liquid particles, which may allow for fewer overall channels to be used in a distillation tower. When the deflector is positioned at one edge of the channel, it may be advantageous to provide a slope in the bottom portion of the channel towards the deflector. This slope may be in addition to the lateral (transverse) sloping of the channels as depicted in FIG. 1. The deflector itself may also be at an angle from the vertical. By angling the deflector, more control may be gained over the vapor flow and the dripping location of the de-entrained liquid.

Figure 3:
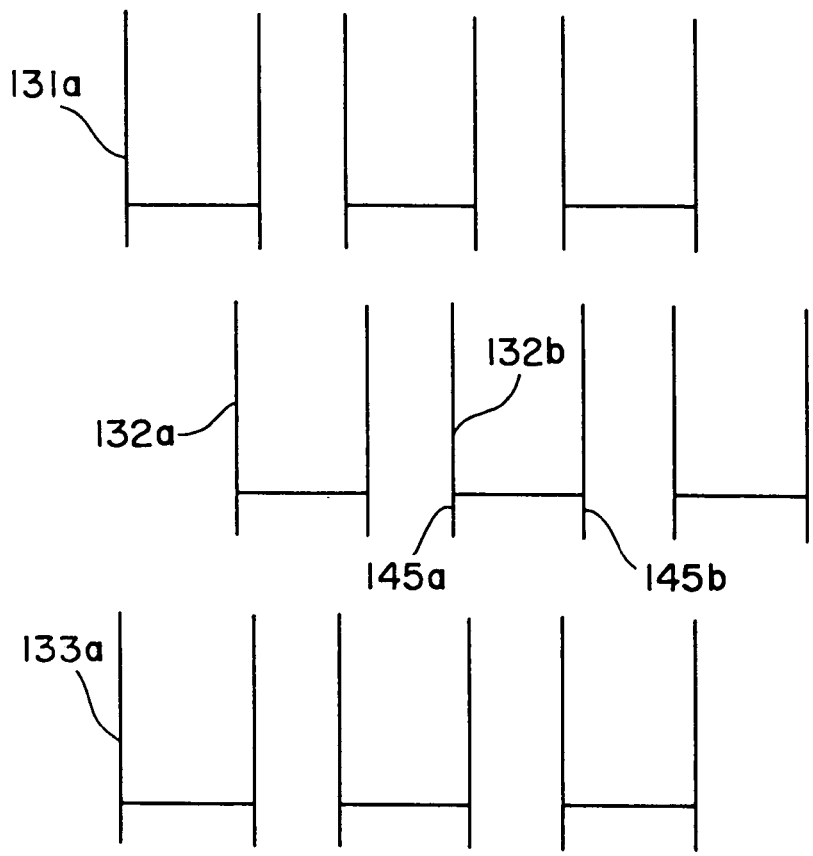
FIG. 3 shows a similar view of an alternative array of collector channels.

As shown in FIG. 3, multiple deflectors may be used in multiple locations on the bottom of channels 131A, 132A, 133A, etc of the upper tiers. In this embodiment two deflectors 145A, B are affixed to the bottom of channel 132B and similar deflectors are also affixed to the other channels, at least in the upper tiers. Here both deflectors are at opposing sides of a channel's bottom, but they may be positioned in any location that will optimize gas flow characteristics, liquid particle separation and liquid collection, allowing the collected liquid to be deposited into the center of the channel below.

The positioning of a deflector over an lower channel may in practice be off-center. This may be due to the predicted vapor flow movement pushing a droplet in a certain direction as it falls. Therefore, in some instances, the deflectors may be positioned such that they are not aligned over the channel below, but so that the dripping liquid will be blown into the appropriate position by the gas flow around and over the channel.

The deflectors in one form may be longitudinal strips extending continuously along the length of the channel. Alternatively, the deflectors may be added in selected locations along the channel length. This would further provide flexibility in directing vapor flow. The deflectors themselves may also have a modified shape that facilitates the collection of liquid or the vapor flow, such as tapering thickness.

Figure 4:
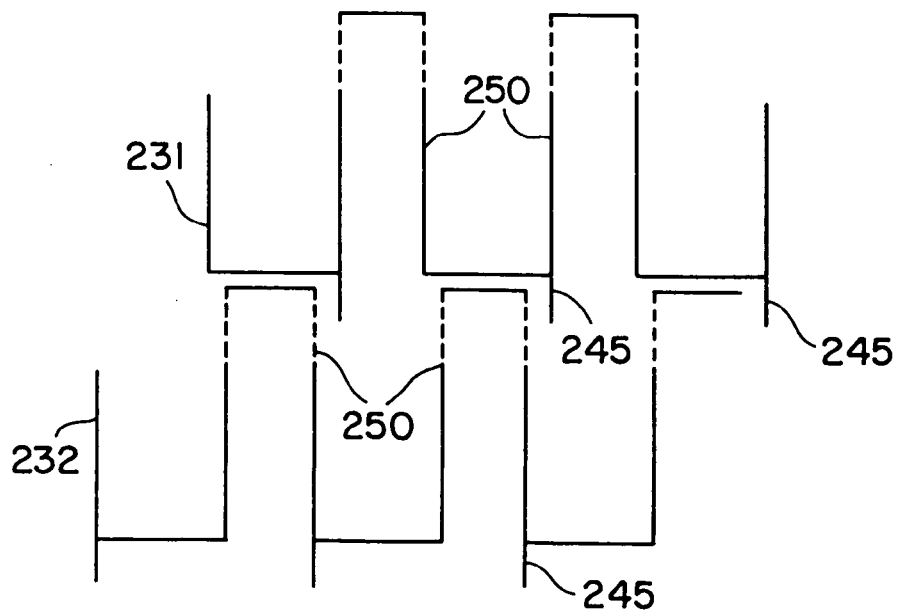
FIG. 4 shows a view of a fabricated array of collector channels.

Referring to FIG. 4, a technique is shown for fabricating channel arrays 231, 232 by bending one piece of thin sheet metal. The deflectors 245 are integrally formed from the same piece of sheet metal or the like used to form the channels themselves. As shown in FIG. 4, the deflectors, which are relatively small compared to the height of the channel side wall, form a downward extension of a sidewall into the region between the tiers. The deflectors may, however, be positioned at any point on the bottom of the channel instead of being at one of the edges. Perforations 250 are formed in the portions of the sheet extending above the channels to permit gas/liquid flow between tiers, while permitting the channels in a tier to be formed from the single sheet of material by suitable perforation and bending.

Vapor with entrained liquid flows upwards between the channels and impacts with the channel edges and deflectors. The liquid de-entrained at those points by inertial separation will collect on the bottom of the channel. The liquid will, however, collect more readily around the deflector, and deposit more freely into the channel below. The deflector therefore not only aids in better separation of the entrained liquid droplets from the greater extent of direction changes in the gas flow but it also promotes better collection of the liquid and deposition of the separated droplets by improving the falling accuracy of the droplets into the lower collection channels. This allows a greater amount of the de-entrained liquid to fall directly into a lower channel, than if the liquid were left to collect on its own on the bottom of the channels.

Figure 5:
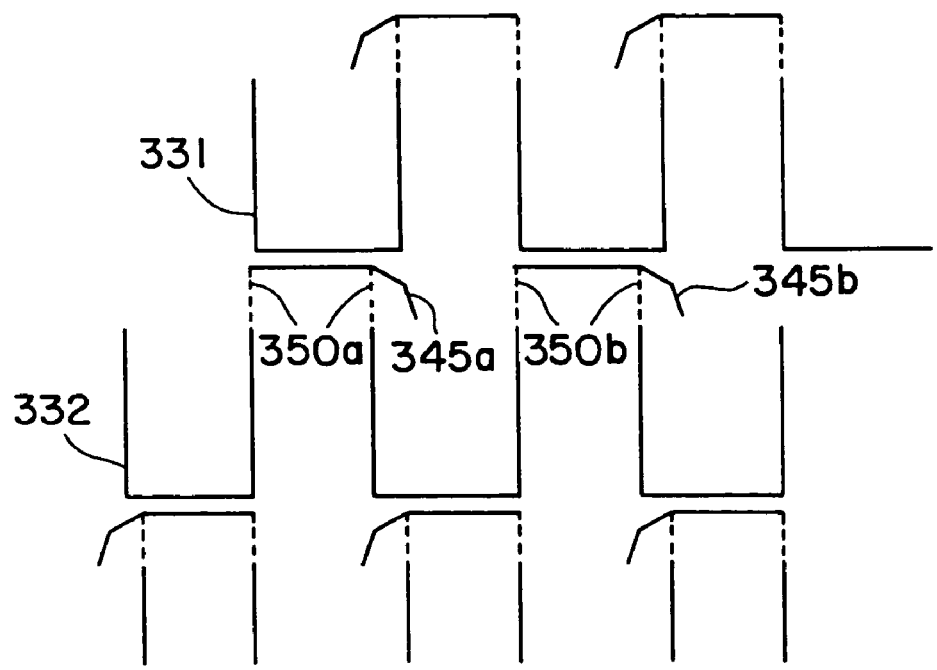
FIG. 5 presents a schematic cross sectional view of another alternative array of collector channels.

In the embodiment of FIG. 5 channel arrays 331, 332 are formed in a similar way by bending and perforating thin sheet metal. Perforations 350a, 350b in the vertical portions of the sheet extending above the collection channels permit fluid flow between the tiers. In this case, the deflectors 345a, 345b in the inter-tier region are mounted not on the upper channels but rather, on the lower channels although they retain the appropriate disposition in the region between the tiers, downwardly towards the lower channel so as to improve separation and collection efficiency. The deflectors are mounted on the lower channels by bending the sheet transversely above the perforated sections 350a, 350b, to provide a deflector integrally formed from the same piece of sheet material (metal or the like). Thus, the channels of the lower tier provide the mounting for the deflectors above. Various foraminous structures, such as an open wire grid, may be substituted for the perforated plate configuration.

Figure 6:
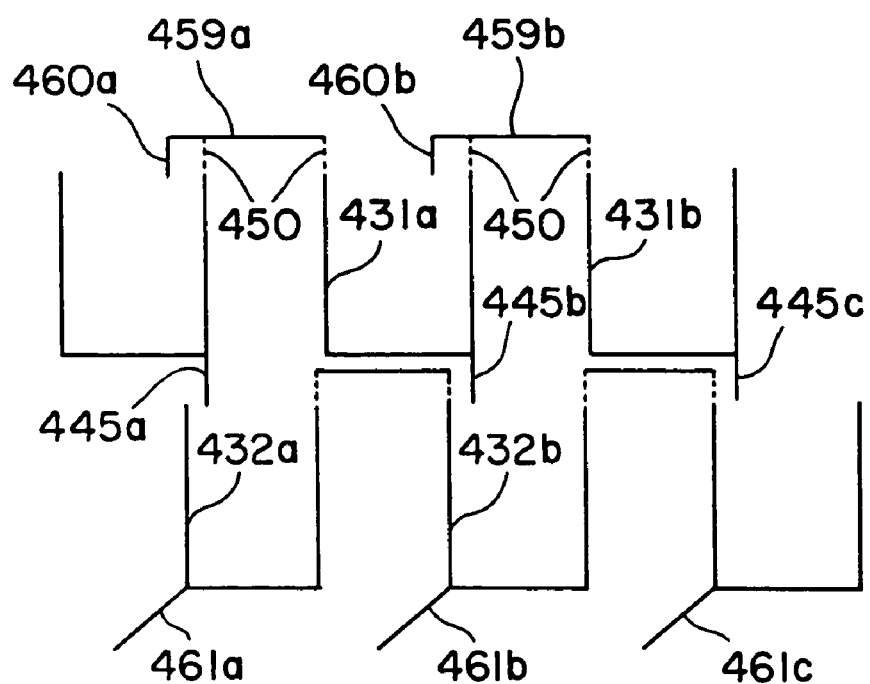
FIG. 6 shows a schematic cross sectional view of yet another alternative array of collector channels.

The top and bottom tiers of the array may have special features. FIG. 6 shows some advantageous treatments for the top channels 431a, 431b and bottom channels 432a, 432b of a two-tier array. A cap type deflector extends over the top of the uppermost channels to assist liquid capture by causing a change in flow direction of the gas flow exiting the upper channels through the foraminous region above the upper tier channels. Each deflector has a horizontal portion or flap 459a, 459b, with a dependent ridge 460a, 460b, which causes the gases leaving perforations 450 to undergo a change of direction which tends to throw the entrained liquid particles out of the flowstream. The bottom tier includes its own type of gas flow deflectors in the form of dependent flaps 461a, 461b, 461c to direct the vapor flow in a preferred pattern. These bottom tier flaps are, in this case, longer, and oriented differently to the vertical deflectors 445a, 445b, on the bottoms of the upper tier.

Figure 7:
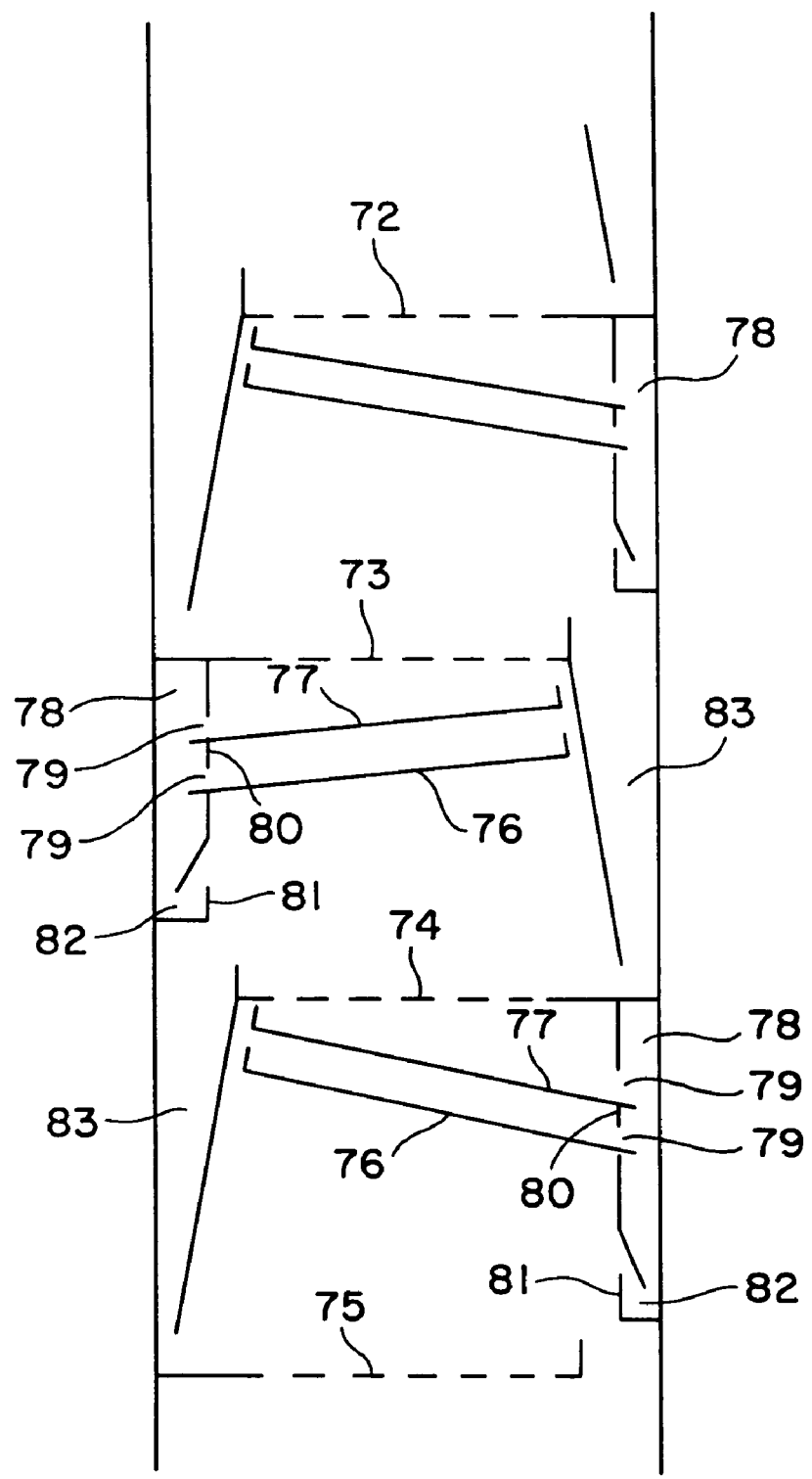
FIG. 7 shows a cross section of a unit with collector channels with control for liquid drainage.
Figure 8:
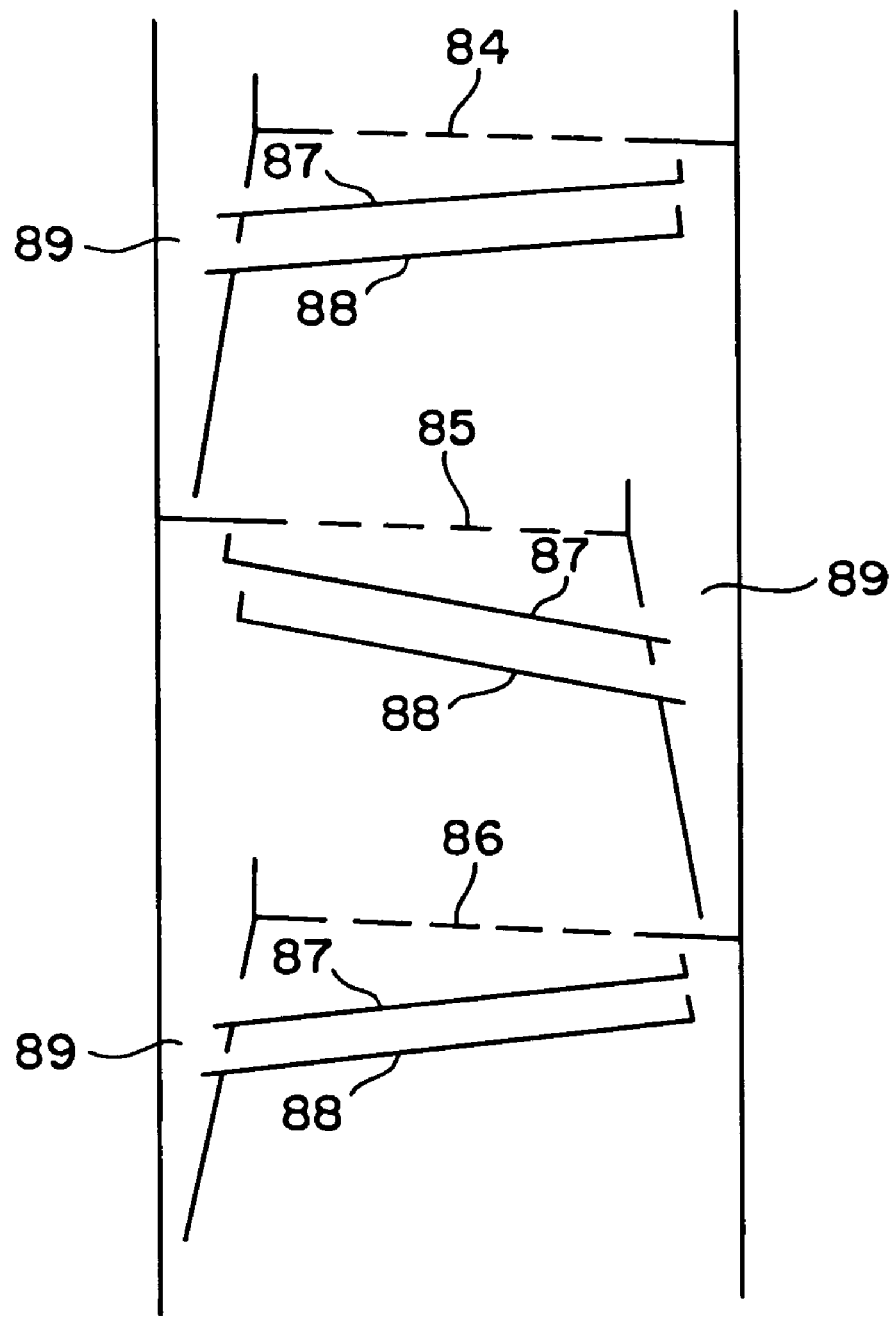
FIG. 8 shows a cross section of a unit with a simplified liquid downcomer configuration.

In order to provide a protected path to return the separated liquid from the channels downwards to a contact plate, a sealed downcomer configuration may be adopted, as shown in FIG. 7. The contact plates 72, 73, 74, 75 in the column are shown with separation zones comprising two trays 76, 77 (indicated only for two zones) each with its collector channels, which empty into sealed drains 78 through channel outlets 79. The channels are provided with deflectors (not shown in the figure) which deflect the gas flow and direct the liquid particle collection, as previously described. Skirts 80 partly block the outlets from the lower channels in each zone to preclude reverse gas flow into the sealed downcomers. The separated liquid from the channels flows into the drains and overflows lip 81 of liquid seal pan 82 and from there falls into downcomers 83 to the contact plate in the preceding contact zone. A simpler construction is shown in FIG. 8 in which the channels 87, 88 under contact plates 84, 85, 86 are sealed into the downcomers 89 (one indicated) with the downcomer discharging onto the contact plate of the same contact zone. As with FIG. 7, the channels are provided with deflectors (not shown) which deflect the gas flow and direct the liquid particle collection. The openings through the downcomer are sized to allow passage of the liquid which was collected in the channels, without excessive gas accompanying the liquid. This configuration has the marginal disadvantage of reducing the increase in column capacity since the liquid is returned to the same contact zone rather than the zone below but this device is still capable, however, of improving deentrainment.

EXAMPLE 1

De-entrainment apparatus is fabricated in five tiers according to the configuration of FIG. 2. The channels are 0.8 inch wide and 1 inch high, with a vertical spacing of 0.5 inch between tiers. The channels are supported in a de-entrainment zone having a rectangular cross section of 39 sq. in. total area. The rigid deflectors extend downward from the channels 0.35 inch.

The channels are closed at one end and collected liquid is withdrawn at an open end for distribution below. If an additional 30% area is assumed for downcomers, liquid feed zones or other hardware, a total device area of 51 in$^2$ or 0.35 ft$^2$ is arrived at. Flooding loads become 17 gpm/ft$^2$ liquid, and 0.41 C-factor.

For the channels with the fitted deflectors, the flooding air rate is about 290 CFM at a liquid feed rate of 6 gpm. Here the flood point is defined as the gas velocity at which more than 6% of the liquid feed is carried up through the channel array without being captured (de-entrained). For the channel area alone, the flooding C-factor is 0.70 ft/s at 22 gpm/ft$^2$. If the area is increased by 30% to account for downcomers, the estimated flooding C-factor becomes 0.54 ft/s at 17 gpm/ft$^2$ liquid. This capacity is about double the capacity of conventional trays.

EXAMPLE 2

For comparison, a base case apparatus has identical channel configuration, except without deflector means and spacing between tiers is reduced to 0.4 inch to achieve comparable pressure drop across the de-entrainment zone. The flooding air rate is about 220 cfm at a liquid rate of 6 gpm. This flooding air rate is about 30% lower than seen with the improved deflector-equipped channel of Example 1.

De-entrainment testing employs air as the carrier gas and isoparaffin hydrocarbon liquid as the dispersed liquid phase. The results of comparative de-entrainment test are given in the following tables.

TABLE 1

Channels with Deflectors

| Liquid feed (gpm) | Gas Rate (cfm) | Uncaptured Liquid (% feed) |
|---|---|---|
| 3.6 | 200 | 3.3 |
| 3.6 | 300 | 8.9 |
| 3.6 | 400 | 15.6 |
| 6 | 300 | 6.8 |
| 11 | 200 | 2.1 |

TABLE 2

Channels without Deflectors

| Liquid feed (gpm) | Gas Rate (cfm) | Uncaptured Liquid (% feed) |
|---|---|---|
| 3.6 | 200 | 5.0 |
| 3.6 | 300 | 14.9 |
| 6 | 200 | 4.4 |
| 6 | 300 | 14.0 |
| 11 | 200 | 3.7 |

The improved channel/deflector design generally provides 20-30% less uncaptured liquid than the same configuration without deflectors. Besides being used in a CoFlo™ type of tray, such as the Trutna design, the improved channel arrays may enhance the capacity of conventional trays, operatively mounted immediately below at least a portion of the trays, i.e. at the top of the free area above the bubbling area. There they could capture entrained liquid, which would otherwise be carried upward to the tray above. These channels are less prone to flooding than conventional de-entrainment devices such as mesh or vane packs. Using only two or three tiers of channels may provide sufficient entrainment catch for such applications, with lower cost and pressure drop. A path of liquid to drain down out of the ends of the channels, such that the liquid is protected from the upwardly vapor, is preferred. One means of achieving this would be to seal the ends of the channels into a baffle, with this plate extending downward close to a wall of the vessel. A liquid head can build up in this protected volume. An opening, possibly incorporating a sealing device such as a seal pan, at the bottom of this protected zone allows liquid to drain out of this protected zone and preferably towards the downcomer leading to the tray below.

The improved channel arrays may be used in a wide variety of applications where de-entrainment of liquid from a vapor stream is desired. These improved channel arrays may be substituted for more conventional de-entrainment devices, such as mesh pads and vane packs. Preferred applications are those where the liquid load is greater than 1 gpm/ft$^2$ in order to take advantage of the liquid-capturing capability of the channel array.

What is claimed is:

1. A separation system for de-entraining liquid particles from an upwardly flowing gaseous stream comprising:
   a de-entrainment zone having a plurality of vertically spaced, parallel tiers of elongated, U-shaped, liquid collector channels arrayed in rows parallel to one another and transversely to the flow of the gaseous stream with a gap between adjacent rows defining a flow path for gas flow, wherein each of the elongated, U-shaped, liquid collector channels in a tier comprises a bottom portion, a pair of sidewalls extending upwardly therefrom, and at least one horizontally-elongated flow deflector, wherein the parallel rows of collector channels of one tier are vertically staggered from the parallel rows of collector channels of each adjacent tier to deflect the flow of the gaseous stream from a lower tier through the gaps between adjacent rows in an upper tier, to separate entrained liquid from the gaseous stream and permit the separated liquid to descend into channels of a lower tier for collection, wherein each deflector on an upper tier extends from one of the pair of sidewalls of the channel in a direction parallel to the sidewall and downwards in the region between the upper tier and an adjacent lower tier towards a channel of the lower tier, between the pair of sidewalls of a corresponding channel in an adjacent lower tier, such that each of the plurality of horizontally-elongated flow deflectors of an upper tier deflects at least a portion of the gaseous flow stream from a lower tier through the gaps between the channels of an upper tier and deposit collected liquid into the channel below the deflector.

2. A separation system according to claim 1 in which the total area of the gaps between the channels of the tier is less than the total area of the tier.

3. A separation system according to claim 2 in which the total area of the gaps between the channels of the tier is from 35 to 50 percent of the total area of the tier.

4. A separation system according to claim 1 in which the tiers are disposed at an angle no more than 10 percent from the horizontal.

5. A multi-tray distillation unit comprising:

at least one contact tray for contacting a gaseous stream flowing upwardly in the unit with liquid passing downwardly through the unit; and at least one separator for de-entraining liquid particles from the gaseous stream after passing through liquid on the contact plate, wherein the at least one separator comprises vertically spaced, parallel tiers of elongated, U-shaped, liquid collector channels arrayed in parallel rows transversely to the flow of the gaseous stream, with the parallel rows of collector channels of one tier vertically staggered from the parallel rows of collector channels of each adjacent tier to deflect the flow of the gaseous stream from a lower tier through gaps between adjacent rows in an upper tier, to separate entrained liquid from the gaseous stream and permit the separated liquid to descend into channels of a lower tier for collection, wherein each of the elongated, U-shaped, liquid collector channels in a tier comprises a bottom portion, a pair of sidewalls extending upwardly therefrom, and at least one horizontally-elongated flow detector extending from one of the pair of sidewalls below the bottom portion in a direction parallel to the pair of sidewalls and, downwardly from the upper tier channel towards a an adjacent lower tier channel below the deflector between the sidewalls of the adjacent lower tier channel, such that each of the plurality of horizontally-elongated flow deflectors of an upper tier deflects at least a portion of the gaseous stream from a lower tier through the gaps between the channels of an upper tier and deposit collected liquid into the channel below the deflector.

6. The distillation unit of claim 5 which comprises a plurality of superimposed separators.

7. The distillation unit of claim 5 which includes a liquid downcomer into which the channels have outlets for collected, separated liquid and which has an outlet for the collected liquid through a liquid seal onto a contact plate.

8. A separation system according to claim 5 in which the total area of the gaps between the channels of the tier is from 35 to 50 percent of the total area of the tier.

9. A separation system according to claim 5 in which the tiers are disposed at an angle no more then 10 percent from the horizontal.

* * * * *